No. 675,408. Patented June 4, 1901.
G. PELTZER.
APPARATUS FOR DEGREASING WOOL.
(Application filed Dec. 26, 1900.)
(No Model.)
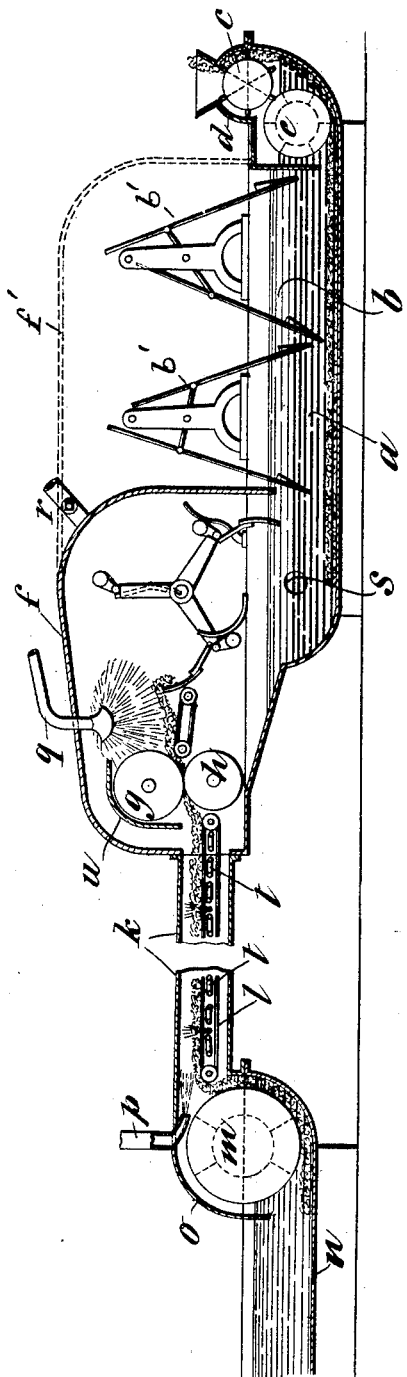

UNITED STATES PATENT OFFICE.

GEORGES PELTZER, OF VERVIERS, BELGIUM.

APPARATUS FOR DEGREASING WOOL.

SPECIFICATION forming part of Letters Patent No. 675,408, dated June 4, 1901.

Application filed December 26, 1900. Serial No. 41,151. (No model.)

*To all whom it may concern:*

Be it known that I, GEORGES PELTZER, a citizen of Belgium, residing at Rue David, Verviers, in the Kingdom of Belgium, have invented certain new and useful Improvements in Apparatus for Removing Fat from Raw Wool, (for which application has been made for a patent in Great Britain, dated October 6, 1900, No. 17,764, and in Belgium, dated October 22, 1900,) of which the following is a specification.

This invention relates to certain additions to and modifications of wool-washing apparatus of known kind, so as to render them available for removing fat from raw wool, as will be described with reference to the accompanying drawing, which is a longitudinal section of a wool-washing apparatus modified according to this invention.

The tank, which is of known kind, provided with agitators and propellers $b'$ of the ordinary or any desired construction, designed to agitate and propel the wool, is charged in any suitable manner with a quantity of carbon tetrachlorid $a$ and above it a layer of water $b$, which has less specific gravity than the tetrachlorid. At one end—the right-hand end—of the tank there is a feed-roller $c$, driven by any convenient motor and mostly inclosed within a casing $d$, the front side of which dips into the liquid in the tank to form a seal. The blades of the roller $c$ fit against a curved part of the casing $d$, so as to prevent communication with the atmosphere. A roller $e$ advances along the bottom of the tank the wool fed in by the roller $c$. The front part of the tank is hooded over by a casing $f$, the rear side of which dips into the liquid to form a seal. This casing might be extended back, as indicated by the dotted lines $f'$, to join the casing $d$, in which water would not be required to prevent the tetrachlorid from evaporating. From the front part of the casing $f$, beyond the pair of delivery-rollers $g\ h$, a channel $k$, containing a long traveling apron $l$, extends to a discharging-roller $m$, mounted in a washing-tank $n$, and over this roller is a shield $o$, which dips into the liquid in the tank $h$. Steam-pipes $t$ for heating are arranged within the channel, and between the coils of these pipes at intervals are located steam-jet pipes. A steam-pipe $p$ has a nozzle discharging a jet of steam into the channel $k$, the jet being directed toward the casing $f$, and a water-pipe $q$ terminates in a distributing-nozzle within the casing. A pipe $r$, provided with a cock or valve, serves for expelling air from the casing $f$ before starting the operation of the apparatus. A pipe $s$, provided with a cock or valve, serves to remove liquid from the upper layers of the carbon tetrachlorid $a$.

The apparatus operates as follows: The casing $f$ having been approximately cleared of air by blowing in steam by the pipe $p$, the pipe $r$ is closed. Raw wool, being then fed by the roller $c$, is advanced along the layer of carbon tetrachlorid $a$ and agitated in the usual way and delivered on a traveling apron, which carries it to the delivery-rollers $g\ h$, which deliver it onto the apron $l$, along which it is carried to the roller $m$, which discharges into the washing-tank $n$. During the passage of the wool along the layer of carbon tetrachlorid $a$ the fat which it contains is dissolved and remains in solution in the tetrachlorid. Most of the liquid accompanying the wool is squeezed out by the rollers $g\ h$, and such tetrachlorid as remains in the wool as it passes along the channel $k$ is evaporated by the current of steam passing over the wool. The steam conveying this vapor on entering the casing over a shield $u$, placed above the roller $g$, is condensed by the water discharged from the pipe $q$, the water of condensation and the condensed tetrachlorid descending into the tank, from which, either continuously or from time to time, portions are taken by the pipe $s$ from the upper layers of the tetrachlorid (which, containing most fat, are the lightest) to be subjected to distillation for separation of the tetrachlorid from the fat.

Having thus described the nature of this invention and the best means I know for carrying the same into practical effect, I claim—

In a wool-cleaning apparatus, the combination of a tank having means for propelling the wool, feeding means at one end thereof, a casing over it forming a liquid seal, a second casing arranged to exclude air from the contents of the tank, a channel extending from said casing, a washing-tank at the end of said channel, a delivery-roller therein, and steam and water distributing nozzles between said propelling means and washing-tank, substantially as described.

In testimony whereof I have hereunto set my hand in presence of two subscribing witnesses.

GEORGES PELTZER.

Witnesses:
J. T. LE COST,
J. DEROUAER.